United States Patent
Torii

[19]

[11] Patent Number: 5,938,704
[45] Date of Patent: Aug. 17, 1999

[54] AUTONOMOUS RUNNING CONTROL SYSTEM FOR VEHICLE AND THE METHOD THERE

[75] Inventor: Tsuyoshi Torii, Tokyo, Japan

[73] Assignee: Fuji Jukogyo Kabushiki Kaisha, Tokyo, Japan

[21] Appl. No.: 08/740,075

[22] Filed: Oct. 24, 1996

[30] Foreign Application Priority Data

Nov. 7, 1995 [JP] Japan .................................. 7-288883

[51] Int. Cl.$^6$ .......................... G06F 165/00; A01B 69/00
[52] U.S. Cl. ............................ 701/23; 701/213; 180/168
[58] Field of Search ............................... 701/23, 25, 213, 701/215, 216; 180/167, 168; 342/357, 457; 318/587

[56] References Cited

U.S. PATENT DOCUMENTS

| | | | |
|---|---|---|---|
| 4,990,841 | 2/1991 | Elder | 318/587 |
| 5,204,814 | 4/1993 | Noonan et al. | 364/424.02 |
| 5,528,888 | 6/1996 | Miyamoto et al. | 56/10.2 F |
| 5,563,786 | 10/1996 | Torii | 364/424.02 |
| 5,769,180 | 6/1998 | Momose et al. | 180/424 |

FOREIGN PATENT DOCUMENTS 63-247612  10/1988  Japan .
2-132321   5/1990   Japan .

*Primary Examiner*—Michael Zanelli
*Attorney, Agent, or Firm*—Smith, Gambrell & Russell; Beveridge, DeGrandi, Weilacher & Young Intellectual Property Group

[57] ABSTRACT

An autonomous running control system capable of guiding a lawn-mowing work vehicle to a target point unmanned with high accuracy. Normally, the vehicle runs autonomously according to the D-GPS/dead reckoning navigation method. When the vehicle runs in an area where obstacles and ups-and-downs exists, the running control is switched to a magnetic guidance and the vehicle moves along the magnetic rail underground. When the vehicle comes into a normal operation again, the running control is shifted to the G-GPS/dead reckoning navigation method again. Further, when the vehicle comes near a target points, the running control is switched to the dead reckoning navigation method capable of guiding the vehicle accurately to the target point. When the vehicle arrives at the work area, it conducts a lawn mowing work according to the trace running control, finding the boundary between mowed and unmowed areas. Thus, the autonomous running control system can make an accurate guidance under any geographical conditions by means of selectively changing the running control method according to terrains and works.

5 Claims, 15 Drawing Sheets

MOWED AREA

UNMOWED AREA

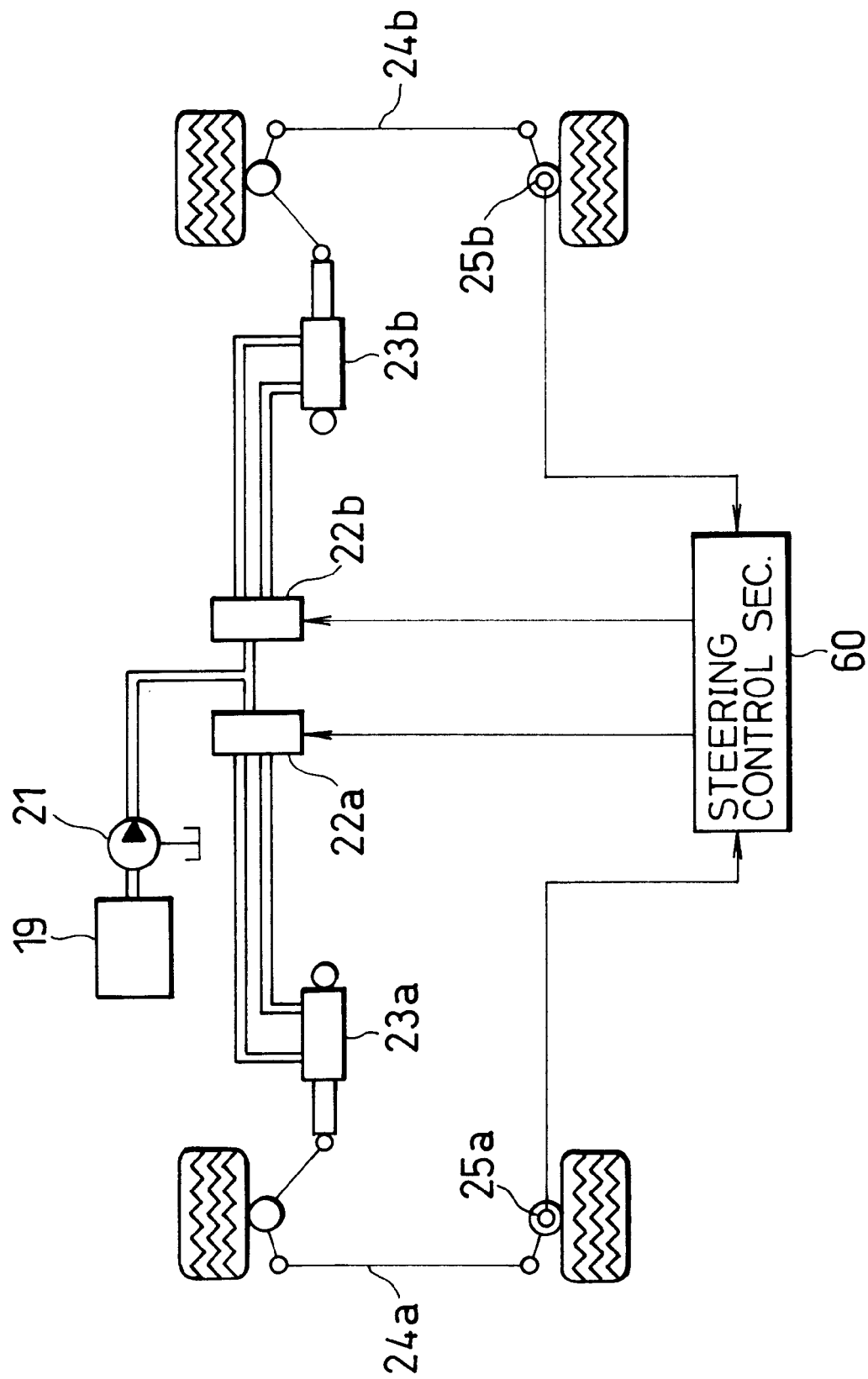

AUTONOMOUS RUNNING CONTROL SYSTEM FOR VEHICLE AND THE METHOD THERE

BACKGROUND OF THE INVENTION

1. Field of the Invention

The present invention relates to an autonomous control system for a vehicle and the method thereof and more particularly to an autonomous control system and the method of an unmanned vehicle which can be operated by identifying a position selectively by a magnetic guidance system or by an autonomous guidance system.

2. Prior Arts

When an off-road vehicle runs autonomously and conducts field work such as mowing lawn or grasses in golf courses, it is important to be able to correctly identify the position where the vehicle is presently located.

There has been a magnetic guidance system in which the vehicle is operated by sensing a magnetic field generated from a magnetic rail laid underground. Further, as examples of recently proposed techniques, Japanese patent application laid open No. Toku-Kai-Sho 63-247612 discloses a technique for finding a vehicular position by receiving a radio wave transmitted from a satellite and further No. Toku-Kai-Hei 2-132321 discloses a technique using a dead reckoning navigation method by which the location of a vehicle is estimated from a running distance and a running direction.

The first technique by the magnetic guidance system is a technique needed when a vehicle is operated at the location where an accurate positioning is required, such as in an area having a lot of obstacles or ups-and-downs, however, this technique has a disadvantage that it costs much money to lay the magnetic rails underground covering a broad golf course or park.

Further, the second technique using a satellite lacks accuracy when it is applied to an autonomous controlled vehicle which travels within a relatively narrow range, because of a clock error of the satellite and the receiver, an orbit error of the satellite, delays of radio wave caused by an ionized layer, a delay of radio waves affected by the atmosphere, and a multipass.

Further, in the third technique using a dead reckoning navigation method, there is a disadvantage that errors are accumulated with an increase of the distance travelled.

SUMMARY OF THE INVENTION

Accordingly, the present invention is intended to obviate the disadvantages of the known arts and it is an object of the present invention to provide an autonomous running control system capable of running autonomously by means of the satellite or the dead reckoning navigation method in case where it is allowed to travel within a relatively wide range and to provide a running control system capable of guiding the vehicle accurately by means of the magnetic guidance system in case where the vehicle needs an accurate guidance.

Disclosed is an autonomous running control system comprising:

first positioning means for identifying a first position of a vehicle based on a positioning information from satellites and a correction information with respect to the positioning information;

second positioning means for identifying a second position of the vehicle based on a running history from a reference point;

third positioning means for detecting an existence of a magnetic rail through outputs of a plurality of magnetic sensors of the vehicle and for identifying a third position of the vehicle on the magnetic rail;

correction means for correcting the second position with the first position and for producing a corrected position of the vehicle;

first running control means for guiding the vehicle autonomously based on the corrected position;

second running control means for guiding the vehicle autonomously based on the second position;

third running control means for guiding the vehicle autonomously along the magnetic rail based on the third position; and running control switching means for selecting a running control means from among the first running control means, the second running control means and the third running control means.

BRIEF DESCRIPTION OF THE DRAWINGS

FIG. 8 is a schematic view of a steering system;

DETAILED DESCRIPTION OF PREFERRED EMBODIMENTS

Figure 1:
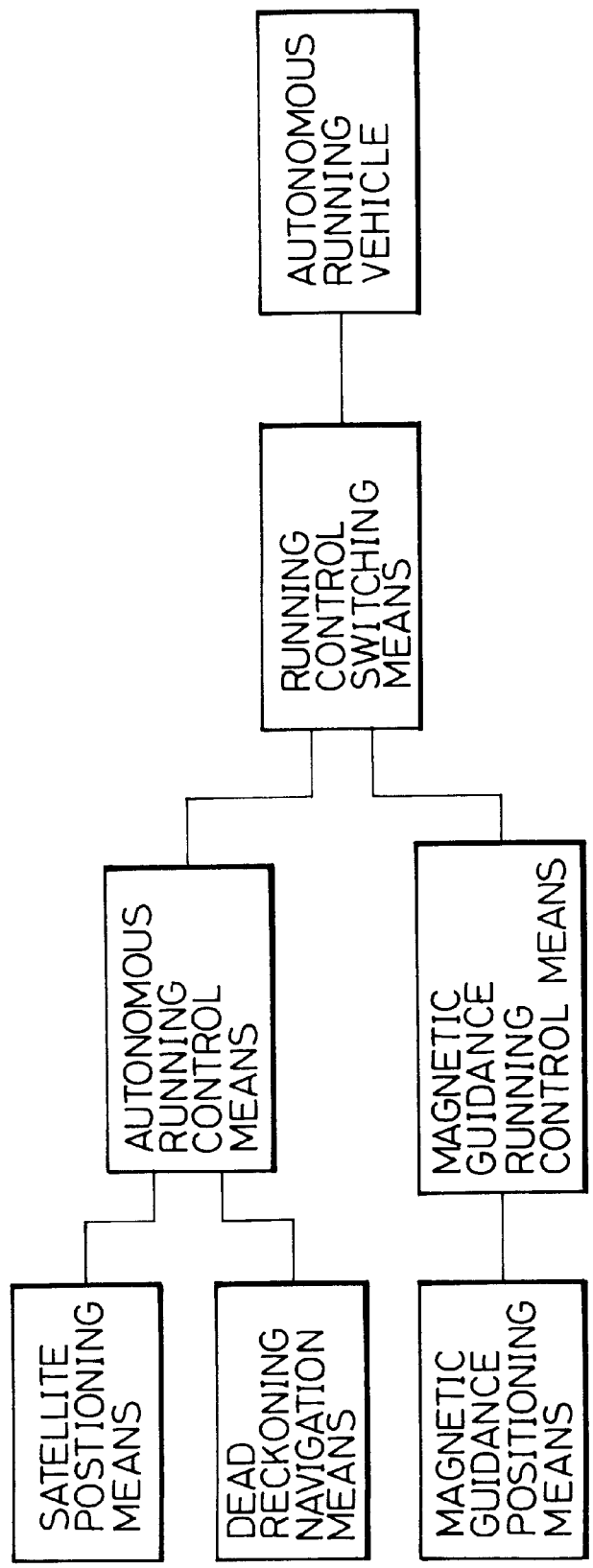
FIG. 1 is a basic block diagram of an autonomous running control system according to the present invention.

FIG. 1 shows the autonomous running control system of the present invention shown in block diagram 4 with a satellite positioning and a dead reckoning navigation means inputting into autonomous running control means. Magnetic guidance positioning means inputs to magnetic guidance running control means. The autonomous running control means and the magnetic guidance running control means input to running control switching means which, in turn, inputs into autonomous vehicle.

Figure 3A:
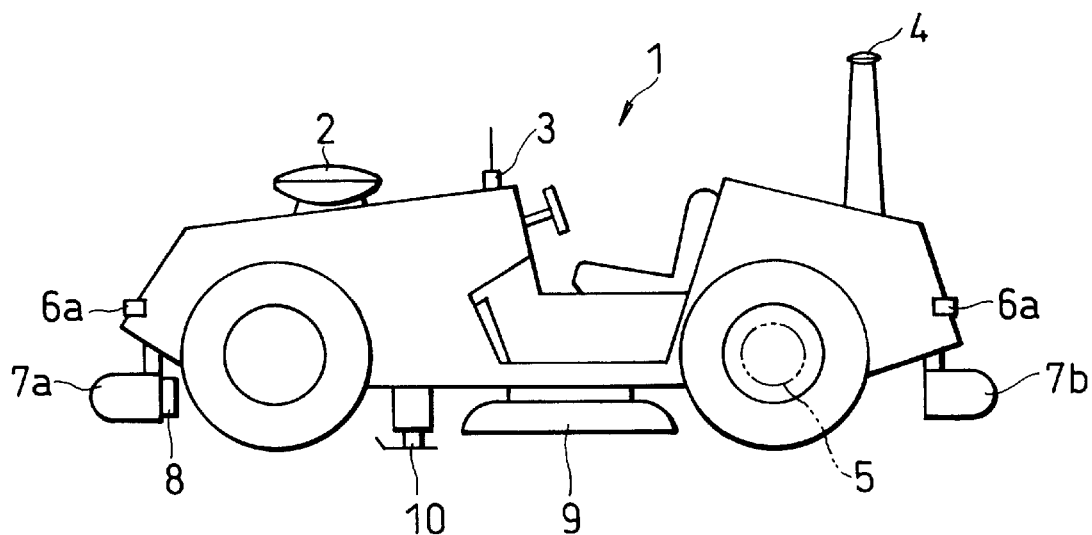
FIG. 3a is a schematic view showing a lawn mower equipped with a mobile station for D-GPS.

Referring now to FIG. 3a, numeral 1 denotes an autonomously controlled vehicle capable of an unmanned operation and more specifically a vehicle for mowing lawn or grasses in a golf course and the like (referred to as a lawn mowing vehicle hereinafter). The lawn mowing vehicle is propelled by an engine and its front and rear wheels can be independently controlled respectively. The lawn mowing vehicle 1 is equipped with a radio receiver for receiving a satellite radio wave to identify the position of the vehicle, a dead reckoning navigation sensor to calculate a present position based on the past running traces, a sensor for detecting obstacles, a sensor for detecting a boundary between mowed and unmowed areas and the like. Further, the vehicle incorporates a sensor for detecting a magnetic field generated from a magnetic rail in order to guide the vehicle more accurately.

The radio receiver according to this embodiment is a GPS (Global Positioning System) receiver for identifying a position by receiving a radio wave from GPS satellites and more specifically it is a GPS receiver for a mobile station based on a so-called Differential Global Positioning System (hereinafter referred to as D-GPS). The D-GPS is for observing the position of a stationary station and sending back a correction information (differential information) to a mobile station.

As is well known, the positioning errors in GPS are caused by a clock error of a satellite or a radio receiver, an orbitat error of a satellite, a delay of radio wave due to the ionized layer, a delay of radio wave by the atmosphere, multipass, an artificially degraded accuracy called a Selectable Availability (S/A) which is known as the largest error and the like. Among these errors, an error having the same phase can be eliminated by using correction information for each of satellites caught by the stationary station whose position has been known and thus the positioning accuracy at the mobile station can be raised up to as much as a couple of meters.

Figure 3B:
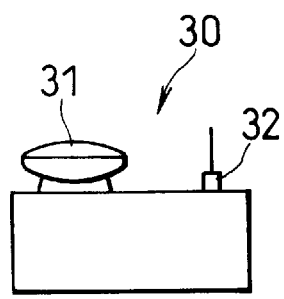
FIG. 3b is a schematic view showing a stationary station for D-GPS.

The lawn mowing vehicle 1 is equipped with an antenna 2 for the GPS receiver and an antenna 3 of the radio receiver for receiving differential information from the stationary station. As shown in FIG. 3b, a stationary station 30 located at a known point is equipped with an antenna 31 for the GPS receiver and an antenna 32 for sending differential information to the radio receiver of the mobile station.

Further, the lawn mowing vehicle 1 is equipped with an earth magnetism sensor 4 and a wheel encoder 5 for the dead reckoning navigation. As for an obstacle detecting sensor, contactless type sensors 6a and 6b such as ultrasonic sensors or optical sensors are mounted at the front and rear portions of the vehicle 1 and additionally contact type sensors 7a and 7b using micro switches and the like are mounted at the front and rear ends of the vehicle 1.

Figure 4:
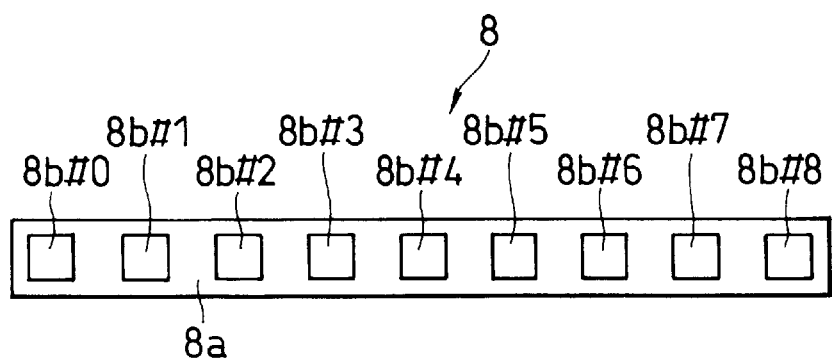
FIG. 4 is a view showing a construction of a magnetic sensor.

Further, in order to detect magnetic field from the magnetic rail, the lawn mowing vehicle 1 is equipped with a magnetic sensor section 8 composed of a plurality of magnetic sensors on the rear side of the contact type sensor 7a. The magnetic rail is composed of magnetized steel material (hereinafter referred to as magnetic steel) which is buried underground. As shown in FIG. 4, in this embodiment, the magnetic sensor section 8 comprises a mounting base 8a installed transversely on the vehicle and nine magnetic sensors 8b#0 through 8b#8 arranged on the mounting base 8a with its sensing face directed to the ground.

Further, under the floor of the lawn mowing vehicle 1 a mowing cutter mechanism 9 for mowing lawn or grasses and a boundary detecting section 10 for detecting a boundary between mowed and unmowed areas.

Figure 5A:
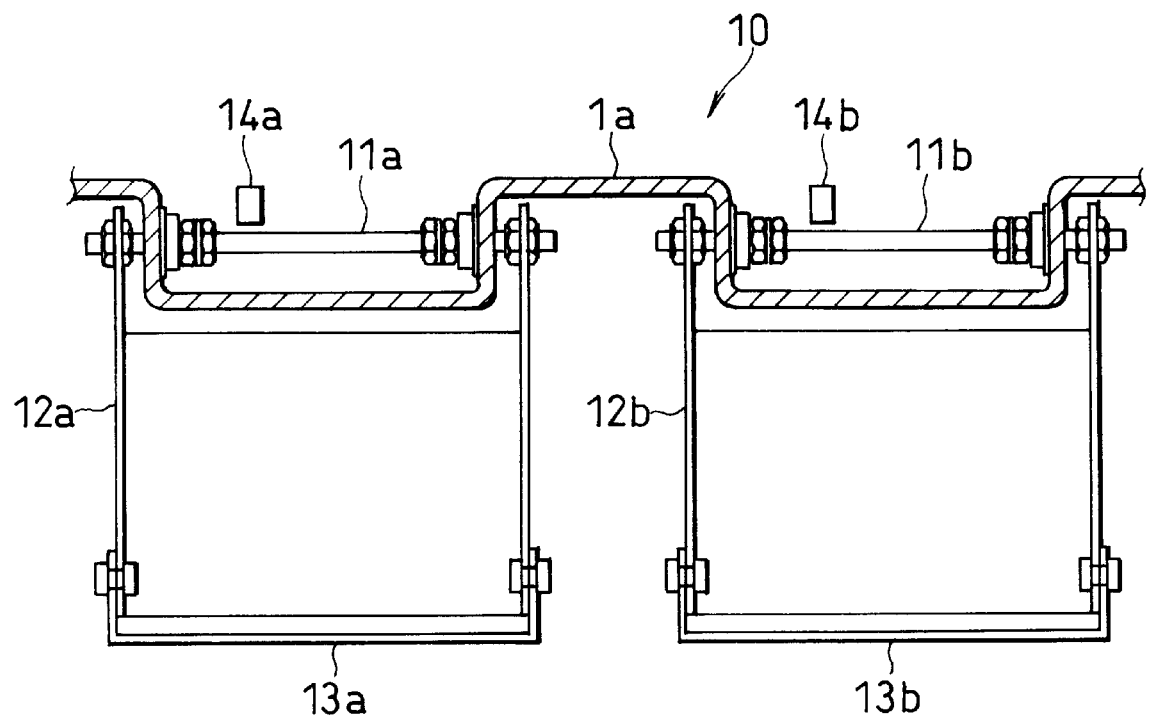
FIG. 5a is a front view showing a boundary detecting sensor.
Figure 5B:
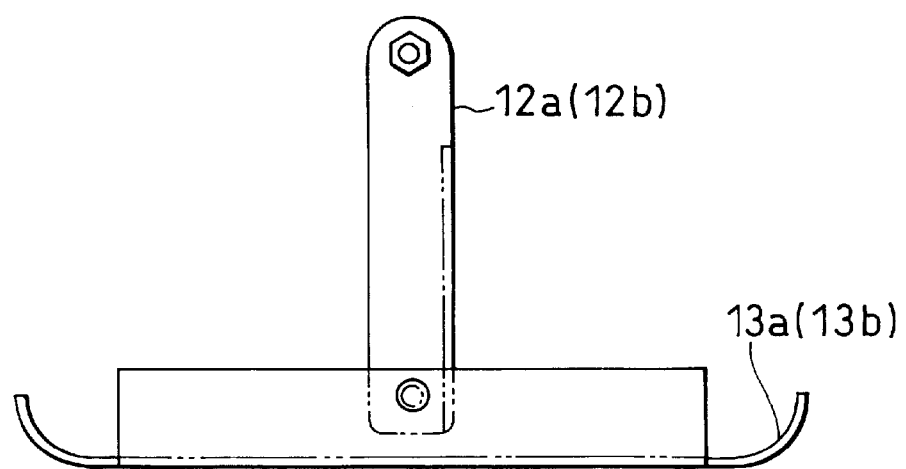
FIG. 5b is a side view showing a boundary detecting sensor.

As shown in a front view of FIG. 5a and a side view of FIG. 5b, the boundary sensor mechanism 10 is composed of two pairs of swinging sled mechanisms which are provided under a floor member 1a of the vehicle 1 and disposed side by side in tile transverse direction thereof. Each swinging sled mechanism comprises two pairs of swing arms 12a (12b) which swing around an axis 11a (11b) fixed to the floor member 1a of the vehicle 1 and a sled 13a (13b) pivotably connected to the lower ends of the swing arms 12a (12b). The sled 13a (13b) moves up and down according to the height of grass or lawn. The sled 13a (13b) has a light weight so as not to trample down grasses or lawn. With the up and down movement of the sled 13a (13b) according to the height of grass or lawn, the swing arms 12a (12b) rotates around the axis 11a (11b) and the rotating angle of the swing arms 12a (12b) is detected by a rotating angle sensor 14a (14b).

Figure 2:
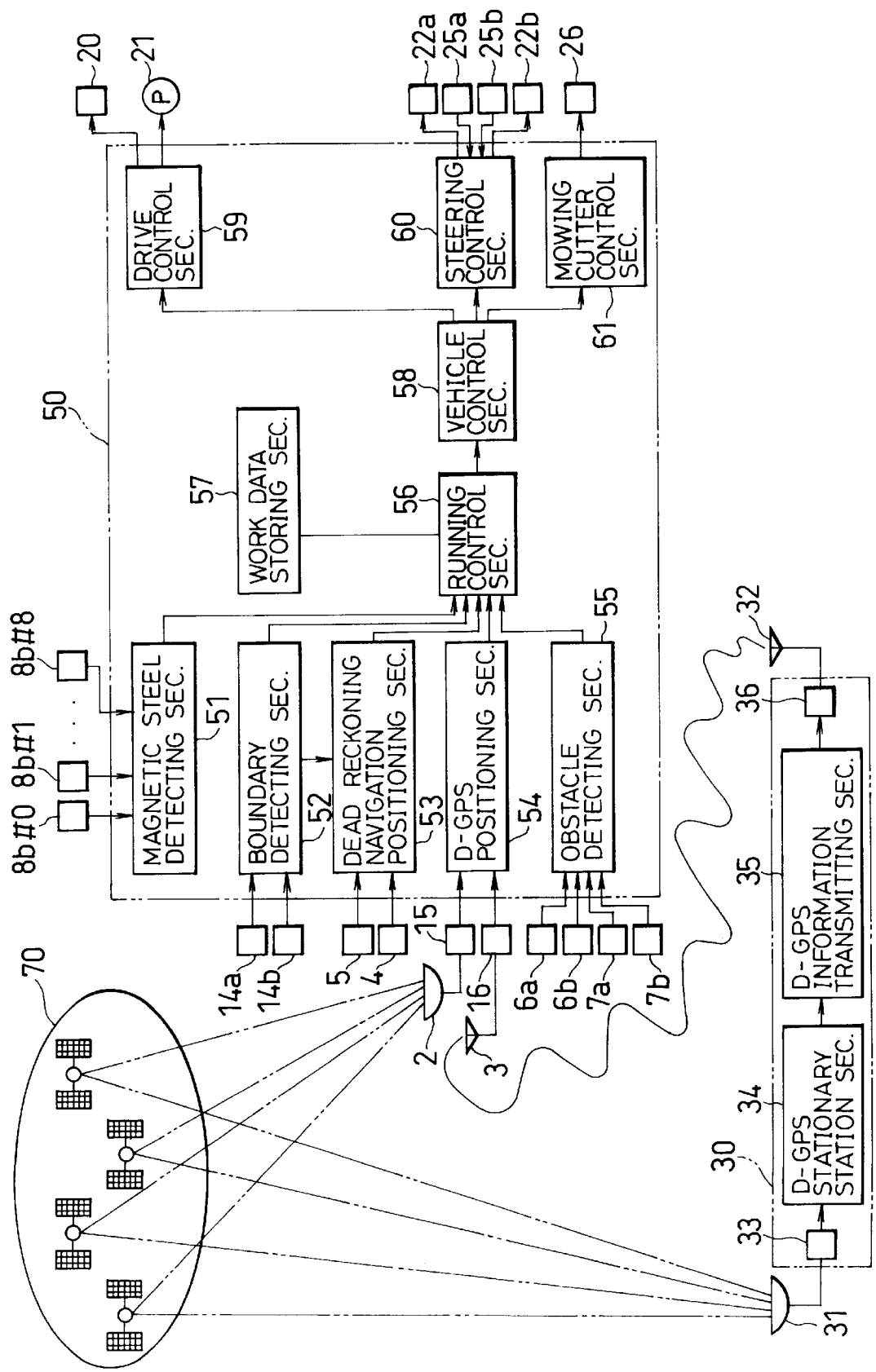
FIG. 2 is a schematic block diagram of an autonomous running control system according to the present invention.

Referring to FIG. 2, the lawn mowing vehicle 1 is equipped with a control device 50 comprising a microcomputer and other devices. The control device 50 is connected to miscellaneous sensors, miscellaneous actuators, a GPS receiver 15 for the mobile station and a radio communication device 16. The control device 50 realizes a satellite positioning means, a dead reckoning navigation means, an earth magnetism positioning means, an autonomous running control means, a magnetic guidance means and a running control switching means.

Describing more in detail, in the control device 50 there are provided with a magnetic steel detecting section 51 connected with the magnetic sensors 8b#0 through 8b#8 of the magnetic sensor section 8, a boundary detecting section 52 connected with the rotating angle sensors 14a and 14b of the boundary sensor mechanism 10, a dead reckoning navigation positioning section 53 connected with the earth magnetism sensor 4 and the wheel encoder 5, a D-GPS positioning section 54 connected with the GPS receiver 15 for the mobile station and the radio communication device 16, an obstacle detecting section 55 connected with the contactless type sensors 6a, 6b and the contact type sensors 7a, 7b, a running control section 56 connected with these detecting sections 51, 52, 53, 54 and 55, a work data storing section 57 wherein a work data map is stored and a vehicle control section 58 for controlling the vehicle according to instructions of the running control section 56. Further, in the control device 50 there are provided with a drive control section 59, a steering control section 60 and a mowing cutter control section 61 which are operated based on outputs from the vehicle control section 58.

The magnetic steel detecting section 51 detects lines of magnetic force from the magnetic steel buried underground of the magnetic rail and finds a position where the magnetic steel is buried. The way of detecting a trail of the magnetic steel is as follows:

An output corresponding to each of the magnetic sensors 8b#0 through 8b#8 is plotted according to the arrangement of the magnetic sensors. Next, all output values are averaged to produce a mean value AVE and a maximum value MAX of those outputs is compared with the mean value AVE. FIG.

6a shows a case where the difference between the maximum value MAX and the mean value AVE exceeds a predetermined value. In this case, it is judged that the magnetic steel is buried near the ground under the magnetic sensor #4 whose output is maximum, particularly at the position between #3 and #5. The correct position is estimated to be #4.5 according to the linear interpolation method.

Figure 6A:
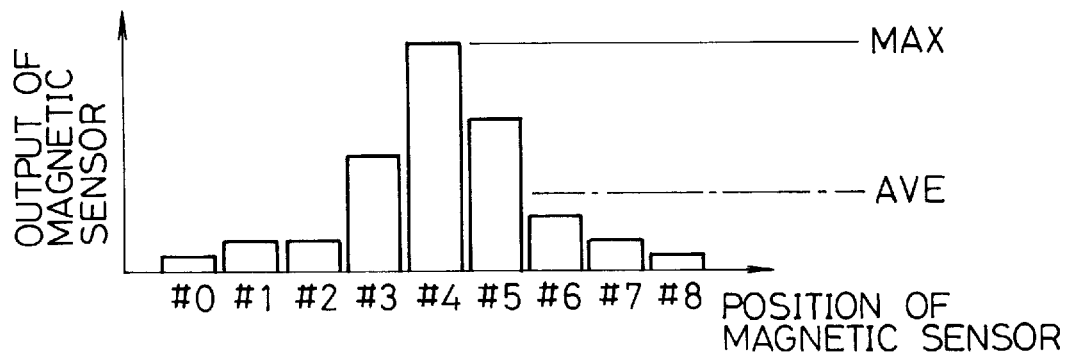
FIG. 6a is a diagram showing outputs of magnetic sensors when detecting magnetic steel.
Figure 6B:
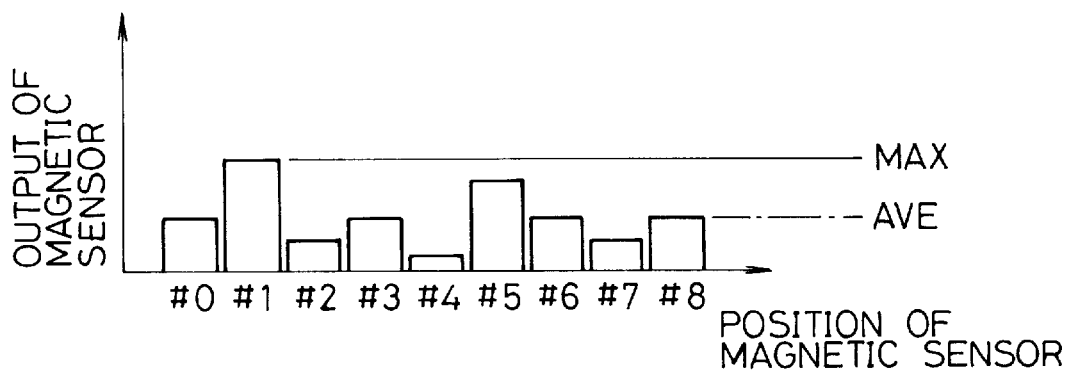
FIG. 6b is diagram showing outputs of magnetic sensors when there is no magnetic steel under magnetic sensors.

On the other hand, FIG. 6b indicates a case where the difference between MAX and AVE is smaller than the predetermined value. In this case, it is judged that the magnetic steel does not exist under the magnet sensors.

Figure 7A:
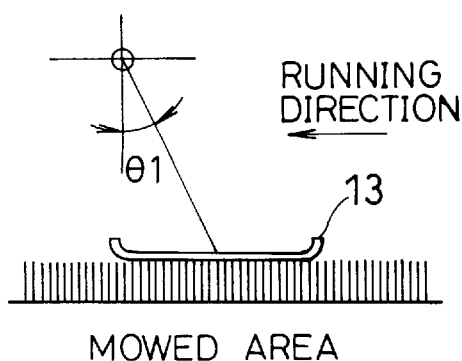
FIG. 7a is a view showing an operation of a boundary detecting sensor on a mowed area.
Figure 7B:
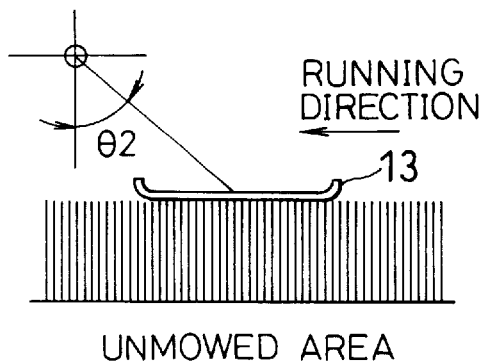
FIG. 7b is a view showing an operation of a boundary detecting sensor on an unmowed area.

Next, in the boundary detecting section 52 the boundary between mowed and unmowed areas is detected by processing rotation angle signals of the rotating angle sensors 14a, 14b of the boundary sensor mechanism 10 according to the height of grasses or lawn. When the vehicle is operated at the work area, one rotating angle sensor 14a detects a rotation angle $\theta_1$ and the other rotating angle sensor 14b detectes a rotation angle $\theta_2$ respectively, as shown in FIGS. 7a and 7b. When the difference between the rotation angle $\theta_1$ and the rotation angle $\theta_2$ is larger than a specified value (in this example the unmowed area is shown in FIG. 7b), it is judged that there is a boundary of mowed and unmowed areas between the rotating angle sensor 14a and 14b and the position data of the boundary is outputted to the running control section 56.

In the dead reckoning navigation positioning section 53, the vehicle speed detected by the wheel encoder 5 is integrated to obtain the traveling distance and at the same time the running direction is detected by the geomagnetic sensor 4. In integrating the traveling distance, the change of the running direction is taken into consideration and thus, by accumulating the distance from the initial start point whose position is known, the present position of the vehicle can be known. The data of the present position is outputted to the running control section 56. In place of the geomagnetic sensor, a gyroscope and the like may be used for detecting the running direction of the vehicle.

In the D-GPS positioning section 54, the position of the vehicle is identified with high accuracy based on the navigation messages obtained through the GPS receiver 15 from a group of satellites 70, for example, messages of correction factors of satellite clocks, orbital information, calender of satellites, arrangements of satellites and the like and based on the differential information obtained through the radio communication device 16 from the stationary station 30. The number of satellites needed for this purpose is at least four per one group in case of the three dimensional a positioning and at least three in case of the two dimensional positioning. Thus obtained position data is outputted to the running control section 56.

The stationary station 30 is composed of a D-GPS stationary station section 34 connected with the GPS receiver 33, a D-GPS information transmitting section 35 for transmitting the differential information from the D-GPS stationary station section 34, a radio communication device 36 connected with the D-GPS information transmitting section 35 and the like.

In the D-GPS stationary station section 34, the position information received from a group of satellites 70 through the GPS receiver 33 is processed into differential correction data. This differential correction data are transformed into the packet data for radio communication in the D-GPS information transmitting section 35 and transmitted through the radio communication device 36 to the mobile station.

In this embodiment, the D-GPS stationary station 30 has been described as an exclusive use for the autonomously controlled vehicle, however existing D-GPS stationary stations for general use may be employed for this purpose.

On the other hand, in the obstacle detecting section 55, the contactless type sensors 6a and 6b and the contact type sensors 7a and 7b detect unforeseen obstacles and detected signals are outputted to the running control section 56.

In the running control section 56, positioning data obtained respectively from the magnetic steel detecting section 51, the boundary detecting section 52, the dead reckoning navigation positioning section 53 and the D-GPS positioning section 54 are processed selectively. That is, in the running control section 56, referring to the work data in the work data storing section 57 and calculating the difference between the present position and the target position, courses to be taken and works to be done are determined. Further, when an obstacle is found by the obstacle detecting section 55, the running control section 56 instructs the vehicle so as to roundabout or stop.

The running control of the lawn mowing vehicle 1 includes an autonomous running control in which either the positioning data from the dead reckoning navigation positioning section 53 or the positioning data corrected by the D-GPS positioning data from the D-GPS positioning section 54 is selected according to situations, a magnetic guidance control based on the data from the magnetic steel detecting section 51 and a trace running control based on the data from the boundary detecting section 52.

In this case, when the vehicle is operated widely in an ordinary terrain having relatively few obstacles or ups-and-downs, the vehicle runs autonomously, selectively using either the positioning data by D-GPS or the positioning data by the dead reckoning navigation method according to the size of the traveling distance to the target point, as will be described hereinafter. When the vehicle is operated in a terrain having a lot of obstacles or ups-and-downs, since it is difficult to position accurately only with the D-GPS or dead reckoning navigation method, the running control is switched from the autonomous running control to the magnetic guidance control so as to guide the vehicle along the magnetic rail. Then, the vehicle is controlled by steering the front and rear wheels so as to coincide the center of the vehicle with the position of the magnetic steel.

The work data storing section 57 includes two areas, namely a ROM area wherein fixed data are stored and a RAM area wherein work data are stored. In the ROM area, topographical data of work areas, overall topographical data of the whole area, location data of the magnetic rail and the like are stored and in the RAM area, processed data from the miscellaneous sensors, positioning data by the D-GPS, positioning data by the dead reckoning navigation method, mutually corrected data of the D-GPS/dead reckoning navigation method which will be described hereinafter, present location data of the vehicle calculated based on this mutually corrected data or the positioning data by the dead reckoning navigation method, positioning data by the magnetic guidance method and the like are memorized.

In the vehicle control section 58, outputs of the running control section 56 are converted into specific command values and these values are outputted to the drive control section 59, the steering control section 60 and the mowing cutter control section 61 respectively.

The drive control section 59 acts as driving running control actuators 20 and controlling a hydraulic pump 21. The running control actuators 20 comprise a throttle actuator for controlling the engine output by adjusting the throttle opening angle, a gear shift actuator, a forward-backward gear change actuator, a brake actuator and other actuators.

The steering control section 60 conducts a steering control (steering amounts feedback control) through a front wheel steering hydraulic control valve 22a and through a rear wheel steering hydraulic control valve 22b based on signals from a front wheel steering angle sensor 25a and a rear wheel steering wheel angle sensor 25b respectively.

The mowing cutter control section 61 conducts a servo-control of the mowing cutter mechanism 9 through a mowing cutter hydraulic control valve 26.

Referring to FIG. 8, the steering system of the e lawn mowing vehicle 1 is constituted by a hydraulic pump 21 driven by the engine 19, a front wheel steering hydraulic control valve 22a, a rear wheel steering hydraulic control valve 22b which are controlled by the steering control section 60, a front wheel steering cylinder 23a connected with the control valve 22a, a rear wheel steering cylinder 23b connected with the control valve 22b, a front wheel steering mechanism 24a driven independently by the steering cylinder 23a and a rear wheel steering mechanism 24b driven independently by the steering cylinder 23b.

When a steering angle of the front and rear wheels is detected by the steering angle sensors 25a, 25b of the steering mechanisms 24a, 24b respectively and is inputted to the steering control section 60, the steering mechanisms 24a, 24b are controlled by the steering control section 60 through the hydraulic control valves 22a, 22b respectively so as to detect the difference between the detected steering angle and the target steering angle.

Figure 9:
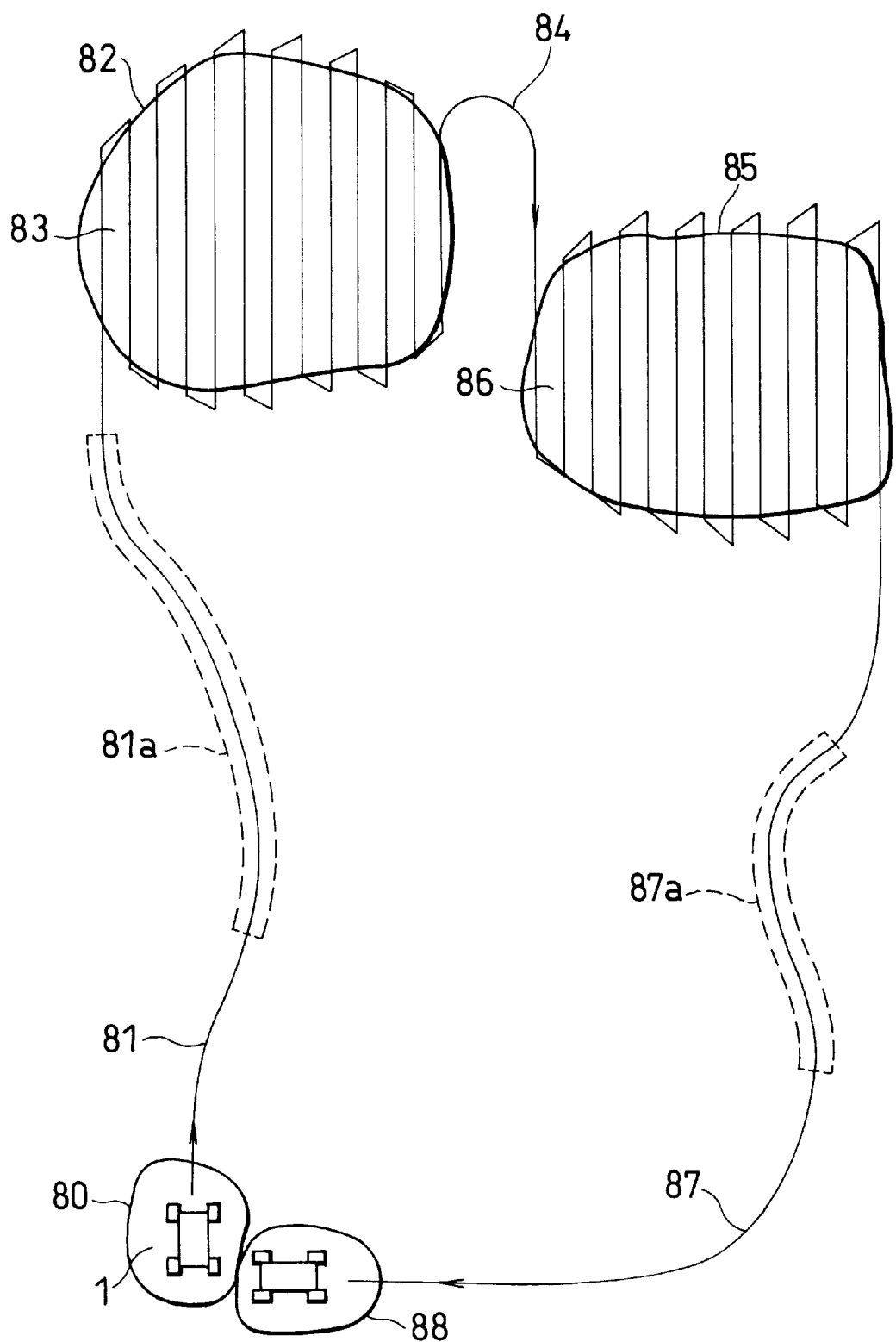
FIG. 9 is an explanatory view showing a running course and work areas.

With respect to a plurality of blocks of the work area as shown in FIG. 9, an example of the unmanned lawn mowing work will be described.

First, the lawn mowing vehicle 1 waits for starting to work at a preparation point 80. Areas enclosed by broken lines show ones whose surrounding terrain abounds in ups-and-downs and where magnetic rails 81a and 87a are furnished.

Figure 10:
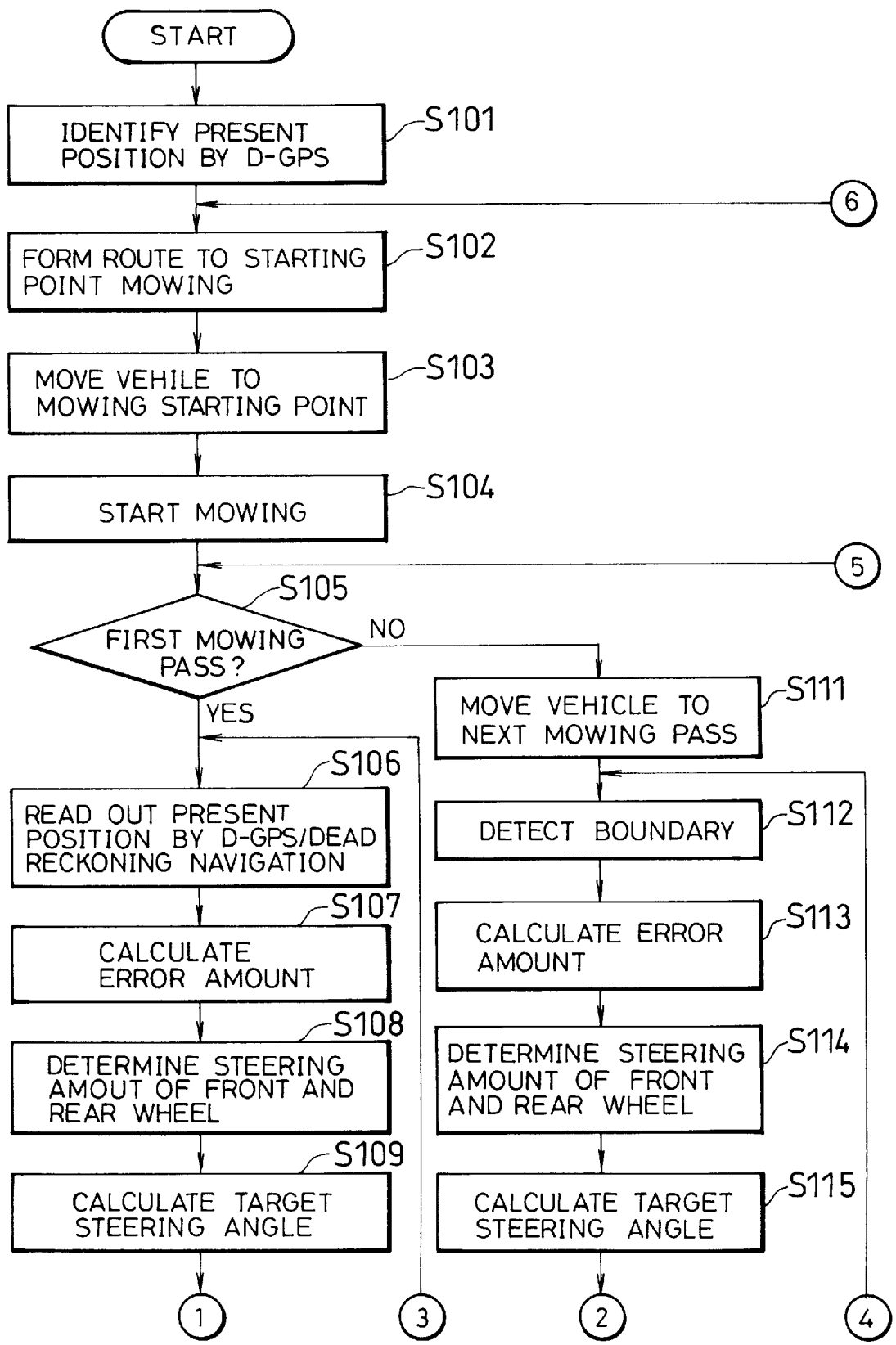
FIG. 10 is a flowchart of a main control routine according to the present invention.
Figure 11:
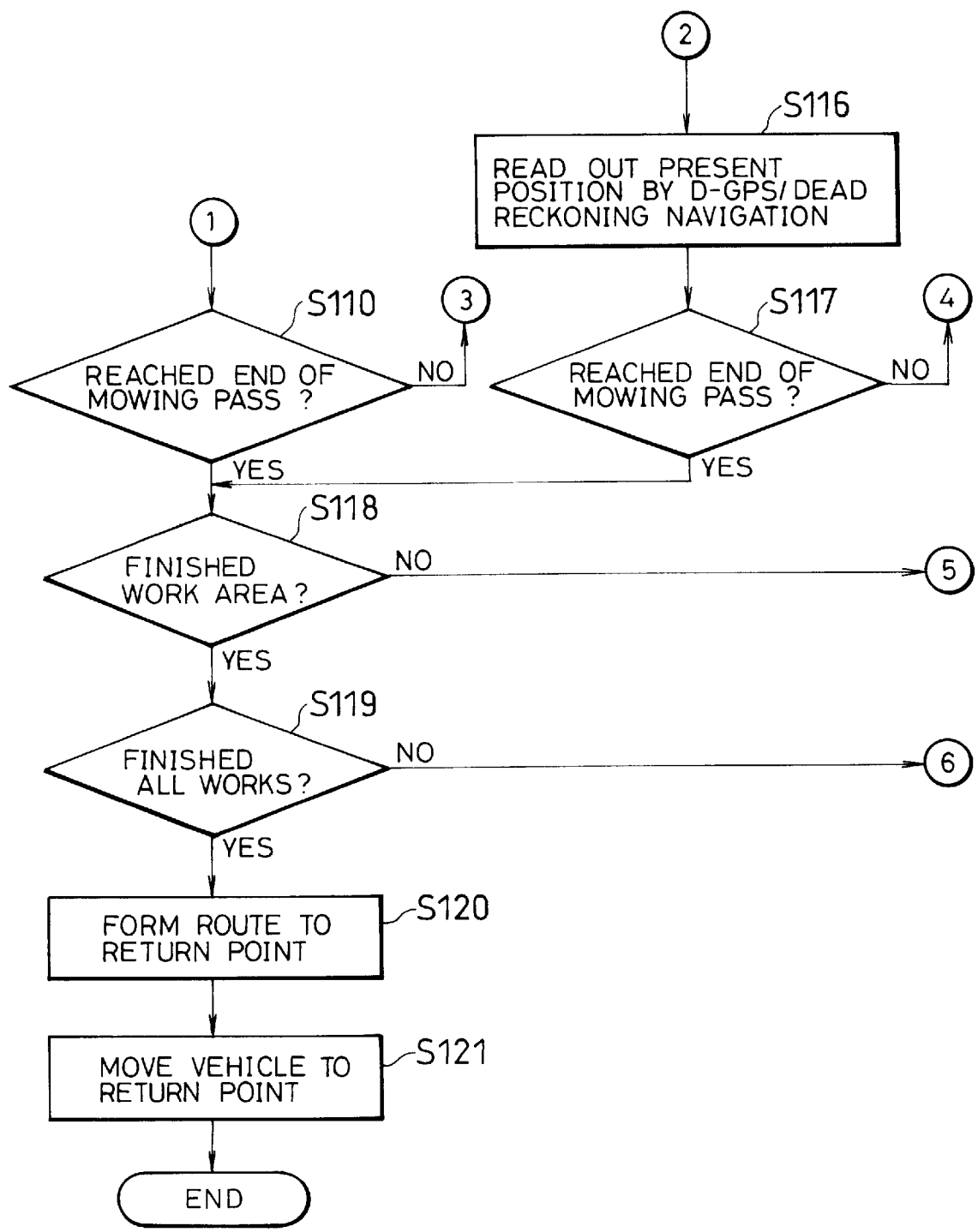
FIG. 11 is a flowchart of a main control routine continued from FIG. 10.
Figure 12:
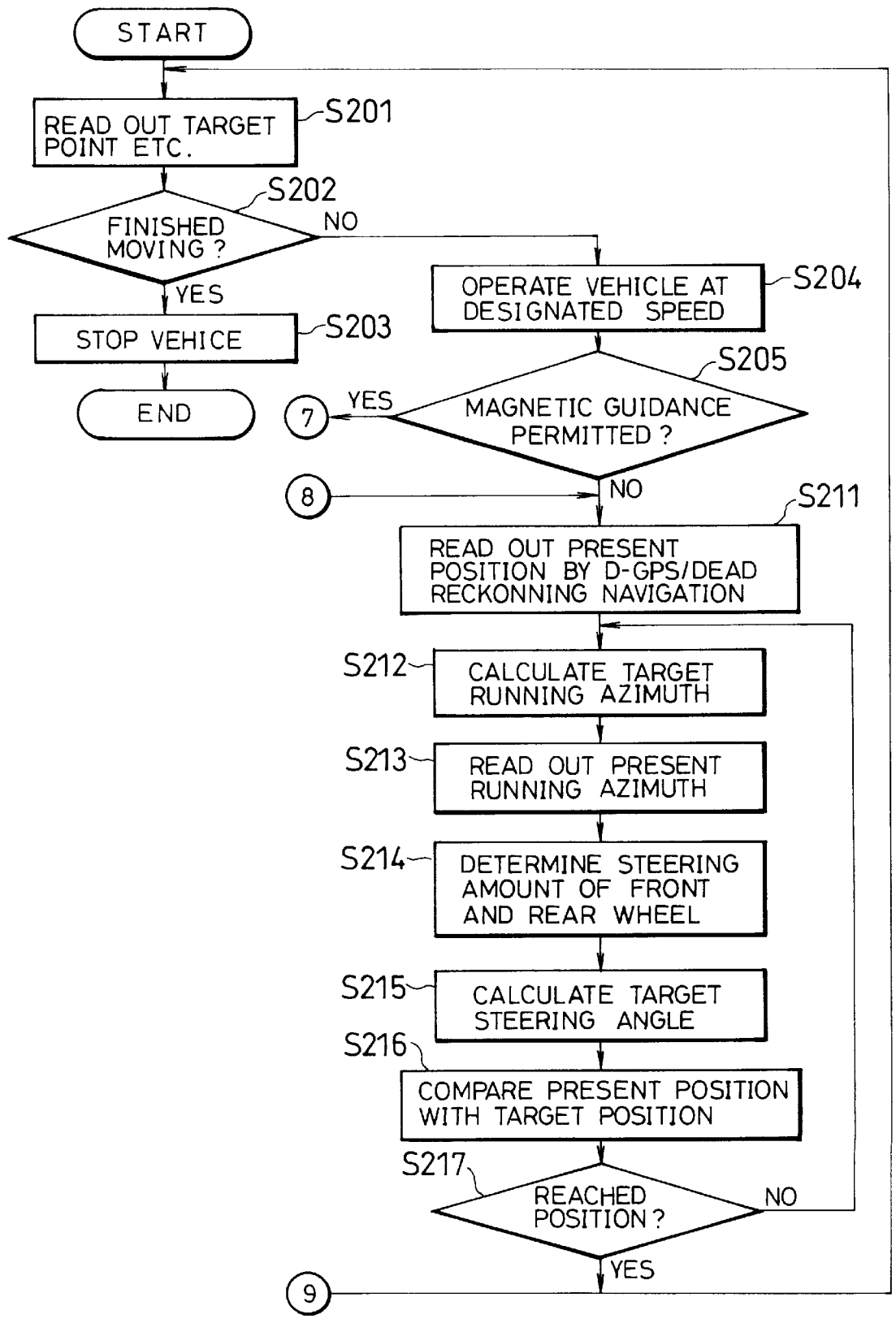
FIG. 12 is a flowchart of a running control routine according to the present invention.
Figure 13:
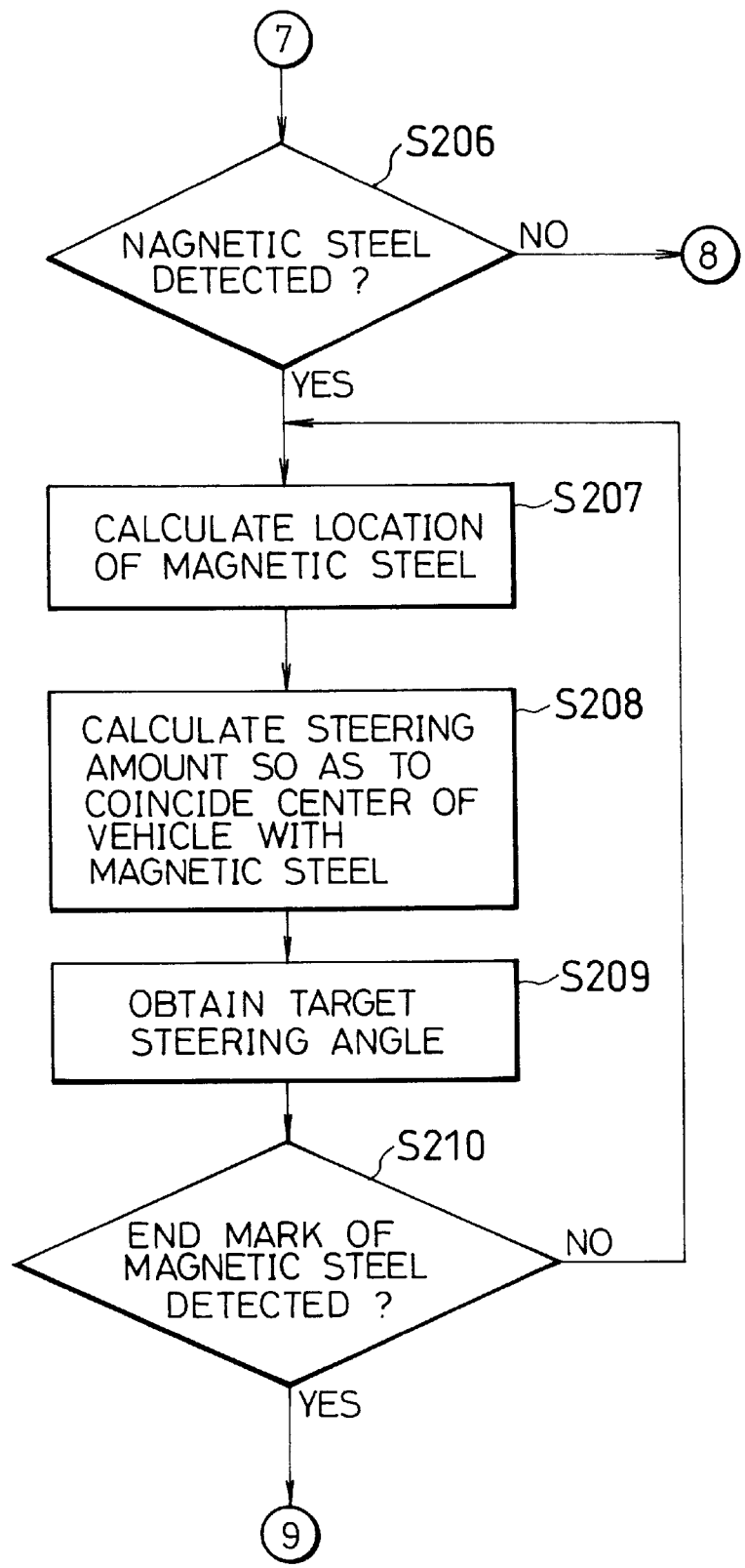
FIG. 13 is a flowchart of a running control routine continued from FIG. 12.

Next, the vehicle 1 moves from the preparation point 80 to a first work area 82 and runs for the mowing work at the work area 82, then moves from the work area 82 to a next work area 85 and runs for the mowing work at the work area 85, and finally returns to a return point 88. These movings and runnings are performed autonomously according to a main control routine as shown in FIG. 10 and FIG. 11 and a moving and running control routine as shown in FIG. 12 and FIG. 13.

Referring to a main control routine shown in FIG. 10 and FIG. 11, first at a step S101 (hereinafter, referred to as S number) the present position at the starting point 80 is identified using D-GPS. The positioning data identified by D-GPS are expressed in the combination of longitude and latitude (altitude too, if necessary) and then converted into the data of a local geographical system stored in the data storing section 57. This data conversion may be made either in the D-GPS positioning section 54 or in the running control section 56.

Next, the program steps to S102 where the topographical data of the first work area 82 are read out and a route 81 from the preparation point 80 to a mowing start point where the mowing work is started is formed. In this case, the magnetic rail 81a is included in the route 81. The program goes to S103 where the moving and running control routine which will be described hereinafter is carried out. According to this routine, the vehicle is moved along the route 81 to the above mowing start point. When the vehicle detects an existence of the magnetic rail 81a during moving on the route, the vehicle running is switched to the magnetic guide control.

Then, the program goes from S103 to S104 in which a mowing cutter hydraulic control valve 26 is opened to feed hydraulic pressure to the mowing cutter mechanism 9. Then, the mowing work is started. The running speed during mowing work is constant (for example 3 to 6 km/h). This s running speed is determined based on taking work efficiency and mowing quality into consideration.

Further, at S105 it is checked whether or not the present work is an initial one. If it is an initial work, the program steps from S105 to S106 where the present position obtained by the D-GPS/dead reckoning navigation method is read out from the work data storing section 57 and then at S107 an error amount of the present position versus the intial mowing pass in the work area 82 is obtained by referring to the work data of the work data storing section 57.

Next, the program goes to S108 where the steering amount of the front and rear wheels with respect to the target steering angle thereof is determined respectively according to the error amount obtained at S107. Then, at S109 the front wheel steering mechanism 24a and the rear wheel steering mechanism 24b are driven respectively through the front wheel steering hydraulic control valve 22a and through the rear wheel steering hydraulic control valve 22b so as to obtain a target steering angle of the front and rear wheels respectively while the steering angle is detected by the front wheel steering angle sensor 25a and the rear wheel steering angle sensor 25b.

After that, at S110 it is checked whether or not the vehicle has reached an end of the initial mowing pass. If it does not reach the end, the program returns to S106 from which the mowing work is continued again. If it reaches the end, at S118 it is judged whether or not the work at the work area (present object work area) has finished.

Since this is an initial work, the program returns from S118 to S105 where it is checked again whether or not the work is initial one. If it is not an initial one, the program is diverted from S105 to S111 where the vehicle is moved aside by as much as the width of the mowing cutter by the operation of the running control actuator 20. Then, at S112 and after, the vehicle makes a trace running along the boundary in the work course 83. This moving of the vehicle to the next mowing pass is carried out based on the data from the D-GPS/dead reckoning navigation method, however in this case since the moving distance is very small, the data from a position calculating routine shown in FIG. 15, namely the data obtained from the dead reckoning navigation method can be used.

Then, at the steps following S112, the vehicle makes a trace running on a route 83 along the boundary between mowed and unmowed areas. At S112 a boundary detecting routine which will be described hereinafter is carried out to detect the boundary between the lawn previously mowed and the unmowed lawn based on signals from the rotating angle sensors 14a, 14b of the boundary sensor section 10. Then, at S113 the error amount of the position of the vehicle with respect to the boundary is calculated to obtain an overlapping amount of mowing.

Then, the program goes to S114 where a respective steering amount of the front and rear wheels is determined and at S115 the front wheel steering mechanism 24a and the rear wheel steering mechanism 24b are operated respectively so as to obtain the target steering angle by controlling the front wheel steering control valve 22a and the rear wheel steering control valve 22b respectively.

After that, at S116 the present position of the vehicle obtained by the D-GPS/dead reckoning navigation method is read out from the work data storing section 57 and at S117 it is checked whether or not the vehicle has reached an end of the present mowing pass. If the vehicle has not reached the end of the present mowing pass, the program goes back to S112 where the trace running along the boundary is continued. If it is judged that the vehicle has reached the end of the present mowing pass, the program steps to S118 where it is judged whether or not all mowing works for the work area 82 have been completed.

Further, the steps through S105 to S118 are repeated until all mowing works for that work area 82 are finished. When all works for the work area are finished, the program goes from S118 to S119 where it is judged whether or not the mowing works for all work areas are finished. In this case, since the mowing work at the next work area 85 is not yet finished, the program returns to the aforementioned step S102 in which a running route 84 connecting the work area 82 with the work area 85 is formed according to the same procedure as described before. According to the moving and running control routine shown in FIG. 12 and FIG. 13, the vehicle moves to the next work area 85 where the mowing work on the first mowing pass is done in accordance with the D-GPS/dead reckoning navigation method and the mowing works on the following passes are done in accordance with the trace running on the route 86.

When the mowing works for the all work areas are completed, the program steps from S119 to S120 where a return route 87 to the return point 88 is formed by looking up the stored data of the work data storing section 57. Then, at S121 the vehicle moves to the return point 88 according to the moving and running routine as shown in FIG. 12 and FIG. 13 and it comes to a standstill therein to terminate the program.

Next, referring to FIG. 12 and FIG. 13, the running control according to the moving and running routine on the routes 81, 84 and 87 will be described. In this embodiment, the routes 81, 84 and 87 are formed based on the positioning data of the vehicle itself and the work data of the work data storing section 57, however these routes themselves may be memorized in the work data storing section 57 beforehand.

According to this routine, when at S201 a target point, a target locus and a predetermined designated running speed are read out from the work data storing section 57, at S202 it is judged whether or not the moving has been finished. If finished, at S203 the vehicle is stopped and the program goes out of the routine. If not finished, the program goes to S204.

At S204, the output of the engine 19 is controlled through the throttle actuator constituting the running control actuator 20 so as to coincide the moving speed of the lawn mowing vehicle 1 detected by the wheel encoder 5 with the designated running speed. While the vehicle runs at the designated running speed, it is checked at S205 whether or not the magnetic guidance is permitted, that is to say, the vehicle has reached a target point from which the magnetic rail (in this embodiment, a magnetic rail 81a provided in the route 81 and a magnetic rail 87a provided in the route 87) is started.

If the magnetic guidance is permitted, the program steps from S205 to S206. At steps after S206, the vehicle runs according to the magnetic guidance and if the magnetic guidance is not permitted, the program steps from S205 to S211 where the vehicle runs according to the D-GPS and the dead reckoning navigation method.

Next, a case where the magnetic guidance is permmitted will be described.

At S206, it is checked whether or not the magnetic steel has been detected by checking an output of the magnetic sensors 8b#0 through 8b#8 and if not detected, it judged that the vehicle has not yet reached a point where the magnetic rail is buried and the program goes to S211 to continue the running according to the D-GPS and the dead reckoning navigation method. If the magnetic steel is detected, it is judged that the vehicle has reached the magnetic rail and the program goes to S207.

At S207, the accurate location where the magnetic steel is buried is calculated from information of the magnetic sensors 8b#0 through 8b#8 and at S209 the front wheel steering mechanism 24a and the rear wheel steering mechanism 24b are driven by operating the front wheel steering hydraulic control valve 22a and the rear wheel steering hydraulic control valve 22b respectively so as to obtain the target steering angle.

After that, the program goes to S210 where it is checked whether or not an end mark indicating the end point of the magnetic rail has been detected. This end mark is, for example, formed by burying a magnetic steel showing a south pole at the end of the magnetic rail showing a north pole on the whole. When the magnetic sensors detect a magnetic steel having a different polarity, it is judged that the vehicle reaches an end point of the magnetic rail.

If the end mark is not detected, the program returns to S207 where the vehicle continues to run along the magnetic rail (81a or 87a). When the end mark is detected, the program goes back to S201, an initial step of this routine, where the vehicle starts an autonomous running according to the D-GPS/dead reckoning navigation method toward a new target point.

Thus, when the vehicle reaches a terrain having a lot of obstacles or ups-and-downs during the autonomous running by the D-GPS/dead reckoning navigation method, the vehicle control is automatically switched to the magnetic guidance by detecting magnetic field from the magnetic rail, whereby the vehicle can arrive at a target point without going off course. Further, since the magnetic rail is furnished only at the places where an accurate positioning is required, the running control system according to the present invention can save the furnishing cost for burying magnetic rails.

The steps after S211 indicate the running control according to the D-GPS and the dead reckoning navigation method.

When at S211 the present position of the vehicle obtained by the present position calculating routine as described hereinafter is read out from the work data storing section 57, the program goes to S212 where a target running azimuth is calculated by comparing the target point with the present position.

Then, at S213 the present azimuth which is detected every moment by the geomagnetic sensor 4 is read out and at S214 the amount of error of the present azimuth with respect to the target azimuth is obtained. According to the amount of error, the steering amount of the front and rear wheels is determined respectively. Then, at S215 the front wheel steering mechanism 24a and the rear wheel steering mechanism 24b are driven through the front wheel steering hydraulic control valve 22a and the rear wheel steering hydraulic control valve 22b respectively so as to obtain a target steering angle for each of the front and rear wheels.

After that, at S216 the present position is cormpared with the target point and at S217 it is judged whether or not the vehicle has reached the target point. If the vehicle has not reached the target point, the program goes back to S212 from which the vehicle continues to run calculating the target running azimuth again. If the vehicle has reached the target point, the program returns to S201 to repeat the same processes.

Here, the positioning process of the present position of the vehicle according to the D-GPS/dead reckoning navigation method will be described below.

Figure 14:
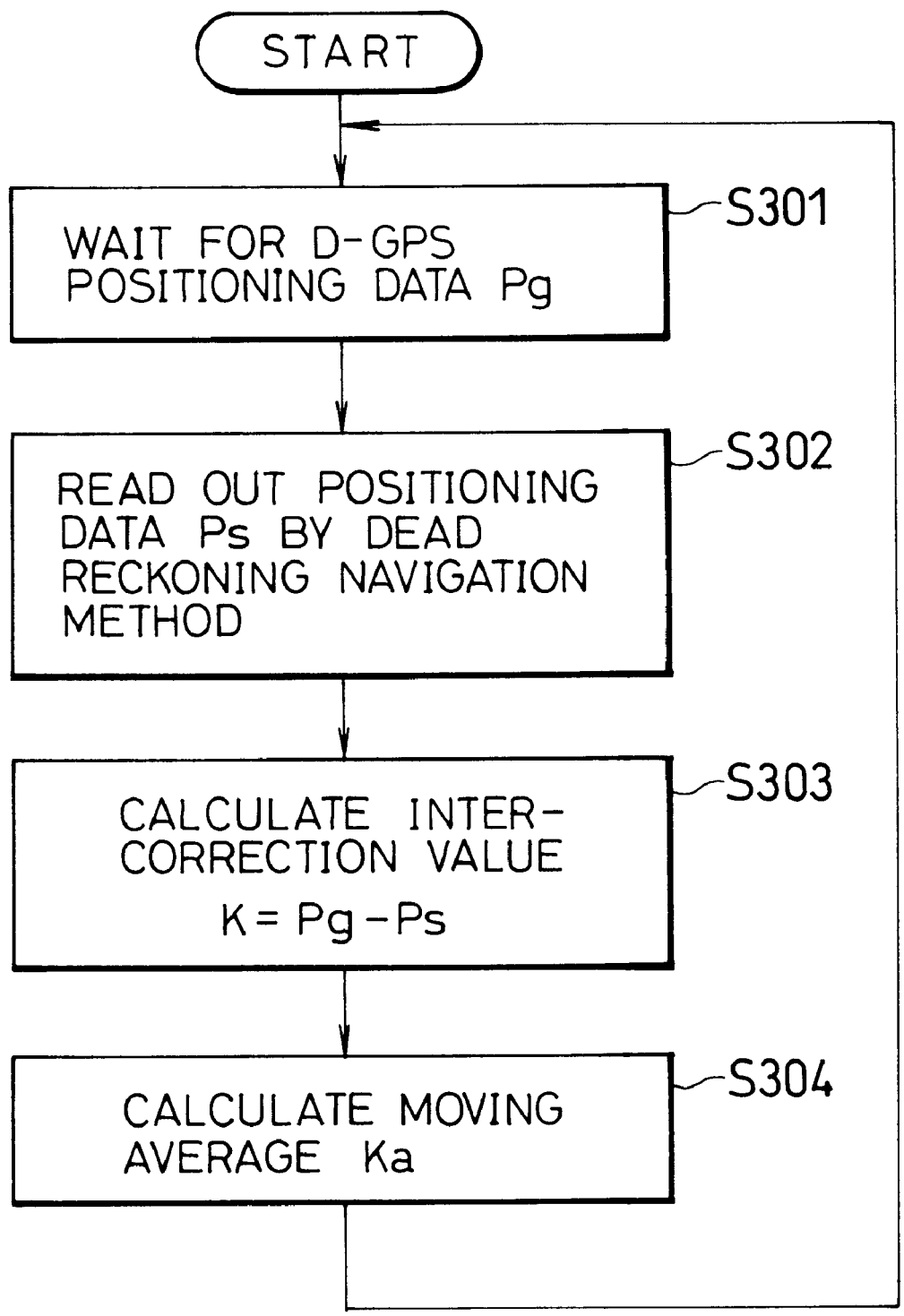
FIG. 14 is a flowchart for calculating an intercorrection coefficient.

Generally the D-GPS provides a far better positioning accuracy than the single GPS, however depending on the aiming condition of satellites or the receiving condition radio wave, in some case a required positioning accuracy can not be obtained at a necessary timing for the running control. To avoid this, the intercorrection value calculating routine by the D-GPS/dead reckoning navigation method as shown in FIG. 14 produces an intercorrection value and the present positioning data according to the dead reckoning navigation method is corrected by the intercorrection value.

Next, the intercorrection value calculating routine by the D-GPS/dead reckoning navigation method will be described in detail.

This routine is carried out independently at the background and always the newest correction value are ready to be looked up. At S301, when the positioning data Pg by D-GPS is inputted, the program goes to S302 where the positioning data Ps by the dead reckoning navigation method is read out. The positioning data Pg is obtained by the differential calculation from the D-GPS radio communication routine which will be described hereinafter in FIG. 17. Further, the positioning data Ps is a data acquired at the same timing as the data Pg is acquired.

Then, the program goes to S303 where an intercorrection value K is obtained by making a difference between the positioning data Pg by D-GPS and the positioning data by the dead reckoning navigation method (K=Pg−Ps). Next, at S304 a moving average Ka of the last n points including the intercorrection value K calculated this time is calculated and the moving average Ka stored in the RAM area of the work data storing section 57 is updated by this newly calculated moving average Ka. The value n is determined beforehand according to an accuracy of the dead reckoning navigation method and the size of accumulated errors.

Figure 15:
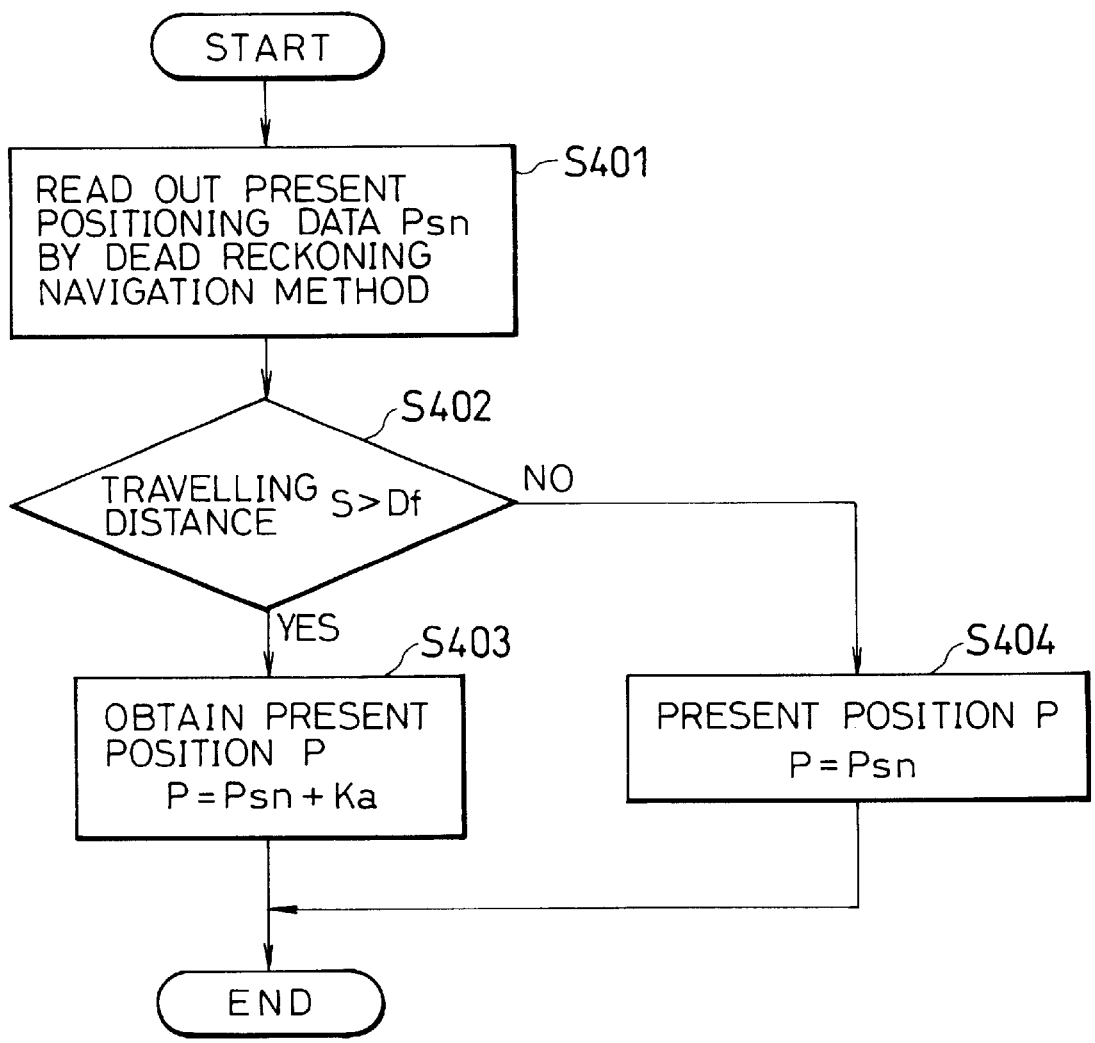
FIG. 15 is a flowchart for calculating a present position.

The averaged intercorrection value Ka is introduced into the calculating routine of the present position as shown in FIG. 15. In a case where the moving distance to the target point is relatively large, the positioning data corrected by the intercorrection value Ka makes the present position and in case where the moving distance to the target point is short, the positioning data itself by the dead reckoning navigation method makes the present position.

That is to say, first at S401 when the present position data Psn by the dead reckoning navigation method is read out, at the next step S402 a moving distance S to the target point is compared with a specified value Df which is predetermined taking the controllability of the system into consideration. If S>Df, the program steps to S403 where the present position P is obtained by adding the averaged intercorrection value to the present position Psn by the dead reckoning navigation method and the program goes out of the routine after being stored in the work data storing section 57.

Thus, since the intercorrection value is always calculated, stored and averaged while the vehicle is running and the positioning data according to the dead reckoning navigation method is always corrected by the updated intercorrection value, the accurate present position can be secured even when the positioning accuracy goes down due to the aiming condition and the radio wave receiving condition. Therefore, it is not necessary to take such a troublesome means as raising accuracy by storing the positioning data of D-GPS while letting the vehicle stop at a predetermined point.

On the other hand, at the above step S402 if S≦Df, namely in case where the moving distance to the target point is very short, the program is diverted from S402 to S404 where, letting the present positioning data Psn by the dead reckoning navigation method be the present position P, this present data is stored in the work data storing section 57 and then the program goes out of the routine.

According to this embodiment, the situation where the positioning data Psn by the dead reckoning navigation method is used as it occurs as it is occurs when the lawn mowing vehicle 1 moves to the next mowing pass (S111 of the main control routine shown in FIG. 10). That is, when the lawn mowing vehicle moves a very short distance like changing to the pass on the same work area, due to the lack of the positioning accuracy of the D-GPS, the movement of the vehicle becomes inaccurate. In this situation, stopping the correction of the positioning data and using the data by the dead reckoning navigation improves the controllability of the system.

Next, the process for detecting the boundary in the trace running at the lawn mowing work area will be described according to a flowchart shown in FIG. 16.

Figure 16:
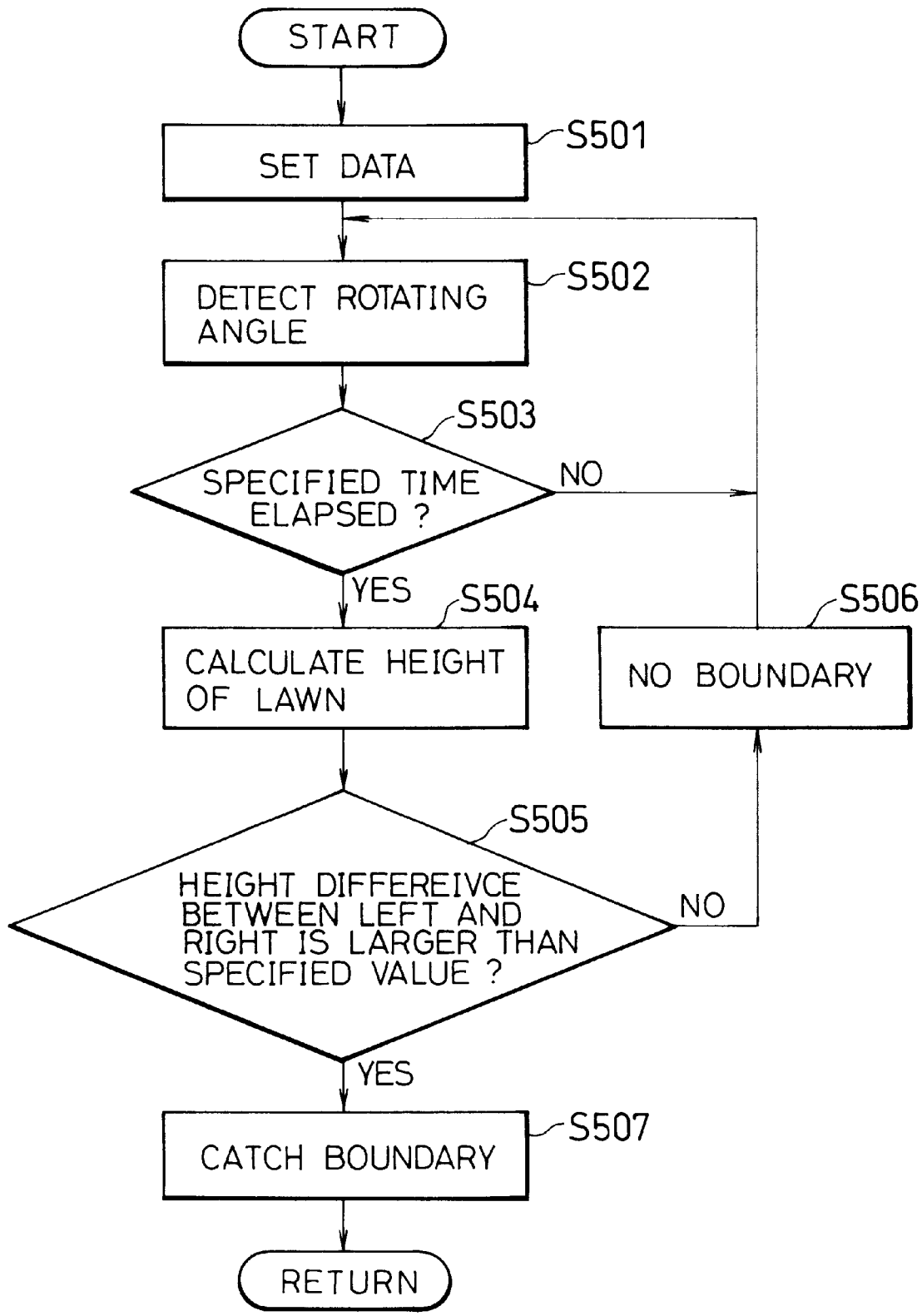
FIG. 16 is a flowchart for calculating a boundary between mowed and unmowed areas.

With respect to the boundary detecting routine as shown in FIG. 16, at S501 the work data such as the cutting height of lawn or grasses and the like are set and at S502 the rotating angle of the swing arms 12a, 12b hanging the left and right sleds 13a, 13b is detected respectively according to signals from the rotating angle sensors 14a, 14b of the boundary detecting mechanism 10.

Then, the program goes to S503 where it is checked whether or not a specified time has elapsed. If a specified time has not elapsed, the program returns to S502 where the rotating angle is detected again and the angle data are accumulated. When a specified time has elapsed and the angle data has been accumulated up to a specified number, the program goes from S503 to S504 in which the angle data is converted into the height of left and right lawns respectively with reference to the work data set at S501.

Further, the program steps from S504 to S505 where it is checked whether a difference between the left and right heights of lawn is larger than a specified value and if the difference is smaller than the specified value, at S506 it is judged that there is no boundary and the program returns to S502. If the difference is larger than the specified value, the program advances to S507 where it is judged that the present position is on the boundary between mowed and unmowed areas and the program goes out of the routine.

Figure 17:
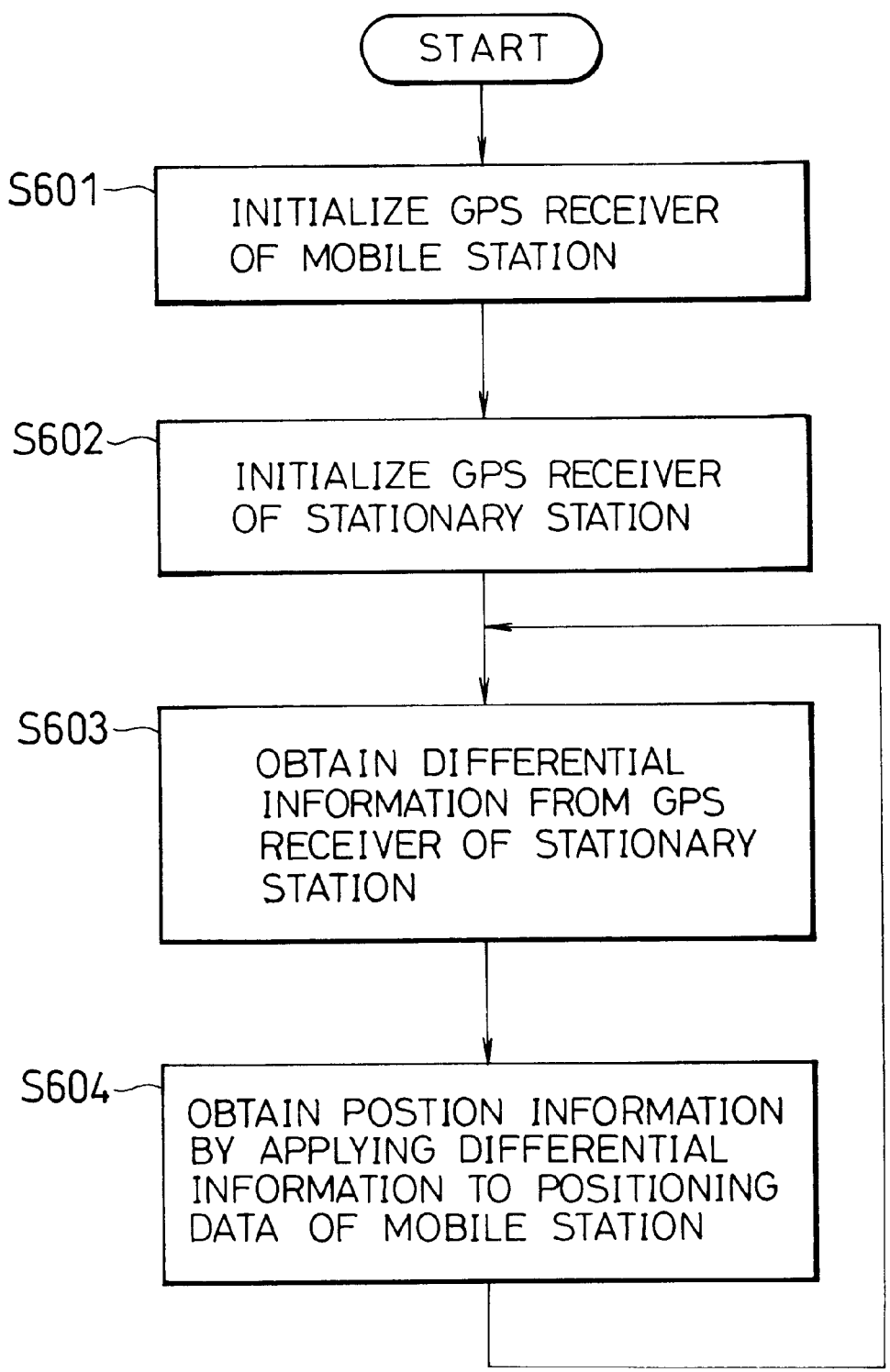
FIG. 17 is a flowchart of a radio wave communication routine of D-GPS.

Further, the data communication between the stationary station 30 and the mobile station is performed on the packet data base according to the D-GPS radio communication routine shown in FIG. 17. First, at S601 the GPS receiver of the mobile station is initialized and at S602 the GPS receiver 33 of the stationary station is initialized by the data transmission through the radio communication devices and 36. Then, the program goes to S603 where the differential information is obtained from the GPS receiver of the stationary station 30 through the data communication by radio.

Next, the program goes to S604 where the differential information transmitted from the stationary station 30 is applied to the positioning data obtained from the GPS receiver 15 of the mobile station and the position of the vehicle is identified through the differential calculation. The program returns to S603 after sending that position data to the running control section 56 and the next data is processessed. The differential calculation may be conducted as one of functions inherently belonging to the receiver 15 of the mobile station.

In summary, according to the present invention, the autonomous running control vehicle is characterized in being able to run autonomously changing its guidance method in accordance with work conditions and geographical conditions. When the vehicle moves from one work area to another work area, the vehicle is guided by the combination of D-GPS and dead reckoning navigation methods and when it runs for doing works in a work area, it is guided by the dead reckoning navigation method. Further, when the vehicle runs in an area where an operational accuracy is difficult to be secured due to obstacles or geographical conditions, the vehicle runs according to the guidance of the magnetic rail buried underground. Thus, the vehicle can reach the target point making an accurate trace without deviating from its target course regardless of geographical conditions.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An autonomous running control system of a vehicle for autonomously guiding said vehicle, the system comprising:

first positioning means for identifying a first position of said vehicle based on a positioning information from satellites and a correction information with respect to said positioning information, second positioning means for identifying a second position of said vehicle based on a running history from a reference point, third positioning means for detecting an existence of a magnetic rail through outputs of a plurality of magnetic sensors of said vehicle and for identifying a third position of said vehicle on said magnetic rail;

correction means for correcting said second position with said first position and for producing a corrected position of said vehicle;

first running control means for guiding said vehicle autonomously based on said corrected position;

second running control means for guiding said vehicle autonomously based on said second position;

third running control means for guiding said vehicle autonomously along said magnetic rail based on said third position; and running control switching means for selecting a running control means from among said first running control means, said second running control means and said third running control means.

2. The autonomous running control system according to claim 1, wherein said second running control means is selected when a traveling distance of said vehicle from the present position to a next target point is smaller than a predetermined value and said first running control means is selected when said traveling distance is larger than said predetermined value.

3. The autonomous running control system according to claim 1, wherein said third positioning means recognizes said vehicle being on said magnetic rail when a difference between a maximum value and an average value of outputs of said magnetic sensors is larger than a predetermined value, and defines said third position based on positions of a magnetic sensor showing said maximum value of output and said magnetic sensors disposed adjacent said magnetic sensor showing said maximum value of output.

4. An autonomous running control method of a vehicle for guiding said vehicle autonomously, comprising identifying a first position of said vehicle based on a positioning information from satellites and a correction information with respect to said positioning information;

identifying a second position of said vehicle based on a running history from a reference point;

detecting an existence of a magnetic rail through outputs of a plurality of magnetic sensors of said vehicle for identifying a third position of said vehicle on said magnetic rail;

correcting said second position with said first position and producing a corrected position of said vehicle; and selecting a running control method from any one of guiding said vehicle based on said corrected position, guiding said vehicle based on said second position and guiding said vehicle based on said third position.

5. An autonomous running control system of a vehicle for autonomously running said vehicle, the system comprising;

vehicle position detecting means for identifying a position of said vehicle based on at least one of GPS information and running history;

first running control means for running said vehicle autonomously based on said identified position;

magnetic rail detecting means for detecting an existence of a magnetic rail;

second running control means for guiding said vehicle autonomously along said detected magnetic rail; and running control switching means for switching a control mode between said first running controls means and said second running control means according to whether a magnetic rail is detected by said magnetic rail detecting means.

* * * * *